United States Patent Office 3,519,283
Patented July 7, 1970

3,519,283
PIPE JOINT AND PROCESS FOR
PREPARING SAME
Irving Tashlick, Rockaway, and Ismar Berlinger, Paterson, N.J., assignors to Interpace Corporation, a corporation of Delaware
Filed Mar. 18, 1966, Ser. No. 535,560
Int. Cl. B65d 53/06; F16j 15/02
U.S. Cl. 277—237                    7 Claims

ABSTRACT OF THE DISCLOSURE

A combination of pipe sections and connecting joint forming annular rubbery cured polyurethane rings and process for casting on the end of a pipe the polyurethane rings. The cured polyurethane rings formed in a cavity between a pipe section and a mold form are reaction products of an organic diisocyanate, a polyalkylene ether triol with an average molecular weight between about 750 and 4750, a catalyst and a solid inert filler, the reaction mixture having an isocyanate to hydroxyl ratio of about 0.9 to about 1.1 NCO for each OH group. The cured polyurethane has about one crosslink for each 1000 to 4000 of its molecular weight.

---

The present invention is concerned with a novel process for joining sections of a pipe, a novel pipe joint, and a novel polymeric composition. More particularly the present invention relates to a novel polymeric rubbery polyurethane composition which can be employed as a pipe joint for connecting pipe sections, and to a novel process for forming such pipe joints.

Pipe joints of cast in place ployurethane have been known in the art for over ten years. Such joints are economical to prepare and resistant, to some extent, to water, acid, alkali, heat and sunlight. However the prior art polyurethane pipe joints are not without disadvantages. Thus, the prior art polyurethane pipe joints give a poor compression set (resistance to permanent deformation). Also, the known polyurethane pipe joints have poor tensile strength in comparison with certain commercial tensile strength requirements. Moreover, although prior art polyurethane pipe joints have a chemical resistance that is better than many other plastic pipe joints, such prior art polyurethane pipe joints have not obtained an optimum in chemical resistance desired by many pipe users.

Difficulties have also been encountered in fabricating prior art polyurethane pipe joints from known formulations. It has been the usual practice to pour a fluid polymerizable polyurethane forming liquid reaction mixture into a space between two pipe sections and thereupon, in the presence of a hardener, polymerize the mixture (an in situ polymerization), at ambient temperature to obtain a rubbery solid joint which has a certain elasticity but yet which adheres strongly to the walls of the pipe sections. The viscosity, however, of prior art formulations, prior to the pouring and the in situ polymerization, has a tendency to increase, a gel or solid often forming in the formulations. This viscosity increase and gel formation decrease the ease in which the formulations can be used for preparing pipe joints, and furthermore can deleteriously affect the ultimate properties of the pipe joints.

It is an object of the present invention to provide a new polymeric polyurethane composition substantially free of reactive groups and which can be used as a substitute for known synthetic rubbers.

It is another object of the present invention to provide a new, solid, non-porous polyurethane pipe joint for joining pipe sections.

Yet another object of the present invention is to provide a novel process for preparing polyurethane pipe joints.

A further object of the invention is to provide a rubbery polymeric polyurethane pipe joint which has a tensile strength in excess of 600 p.s.i., an initial compression set of less than 4 percent, an elongation greater than 80 percent, a hardness betwen 50–90 Shore A at 75° F., and a better chemical resistance in comparison with known polymeric polyurethane pipe joints.

Other objects and advantages of the invention will be apparent to those skilled in the art from the following description, examples and drawings.

It has been found that the foregoing objectives can be accomplished by providing a novel rubbery polymeric polyurethane which is a cured solid material of a liquid reaction mixture consisting essentially of an organic diisocyanate, a polyakylene ether triol of an average molecular weight of between about 750 and 4750, a catalyst, a solid inert filler and in a preferred embodiment, a diol of an average molecular weight of between about 110 and about 400. The reaction mixture also should have an isocyanate (NCO) to hydroxyl (OH) ratio of about 0.9 to about 1.1 NCO for each OH group in the reaction mixture.

Any type of diisocyanate can be used in preparing the liquid reaction mixture. Examples of suitable diisocyanates include tolylene-2,4-diisocyanate, tolylene-2,6 diisocyanate, diphenylmethane-p,p' - diisocyanate, meta-phenylene diisocyanate, para - phenylene diisocyanate, naphthylene - 1,4 - diisocyanate, naphthylene-1,5-diisocyanate, naphthylene-2,7-diisocyanate, dimehyl diphenyl methane diisocyanate, bitolylene diisocyanate, dicyclohexylmethane-4,4'-diisocyanate, di - para-xylylmethane-4, 4' - diisocyanate, diphenylene-4,4'-diisocyanate and 4,4'-cyclohexyl-phenyl diisocyanate. Mixtures of any of these compounds can also be used, e.g., and 80–20 mixture of 2,4- and 2,6-tolylene diisocyanates or a 65–35 mixture of 2,4- and 2,6-tolylene diisocyanates. Also, all ranges of partially reacted diisocyanates, commonly referred to in the art as "prepolymers," can be used.

Due to cost, better chemical resistance and better strength characteristics, various isomers of tolylene diisocyanate are preferred, a preferred diisocyanate being the commercially available mixture of 80% 2,4-tolylene diisocyanate and 20% 2,6-tolylene diisocyanate and sold under the names Niax Isocyanate TDI by Union Carbide Corp., Nacconate 80 by Allied Chemical Corp. and Hylene TM by Du Pont.

The polyalkylene ether triol referred to above and having an average molecular weight of between about 750 to 4750 should consist of alkylene radicals containing at least two carbon atoms and should contain primary or secondary hydroxyl groups. The triol also should be liquid at room temperature and mutually soluble over the useful temperature range.

The structure of a typical polyalkylene triol may be illustrated as follows:

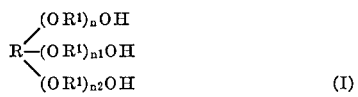 (I)

R in (I) is an alkylyne radical (usually from a triol such as glycerine, trimethylolpropane or hexanetriol) and $R^1$ is an alkylene radical containing at least two carbon atoms, e.g. ethylene, propylene and butylene, the propylene radical being preferred. The sum of $n$, $n_1$ and $n_2$ should be such that the triol has an average molecular weight of between about 750 and 4750.

In the preferred embodiment, the diol is a low molecular weight polyalkylene glycol, a preferred diol being dipropylene glycol having the structural formula:

$$CH_3-CH-CH_2-O-CH_2-CH-CH_3$$
$$\quad\;\; |\qquad\qquad\qquad\quad\; |$$
$$\quad\;\; OH\qquad\qquad\qquad\; OH \qquad (II)$$

However, any diol with an average molecular weight of between about 110 to about 400 can be used. Such diols include hexylene glycol, a 2,2,4-trimethylpentane-1,3 diol, tripropylene glycol, and isomers of dipropylene glycol.

The presence of catalysts in the liquid reaction mixture insures a fast cure. By reason of solubility, efficiency and stability, lead octoate and lead naphthenate are the preferred catalysts. Additional suitable catalysts include other lead salts of fatty acids, soluble organotin compounds, organic salts of mercury, tin (stannous), lead and soluble tertiary amines. The catalysts are normally used in minor amounts of less than 1 weight percent based on the total weight of components, including filler, pigment and the like, in the liquid reaction mixture. In the case of lead catalysts, the amount should be less than 0.5 percent.

It is essential in preparing the novel polyurethanes of the present invention that the components be present in the liquid reaction mixture in amounts that are sufficient to provide about one crosslink for each 1000 to 4000 molecular weight of final solid polymeric polyurethane. The molecular weight per crosslink (Mw./C.) is defined by the general equation:

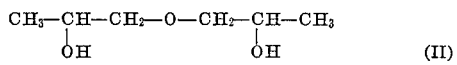
(III)

In the case of a polymer based on tolylene diisocyanates, a low molecular weight diol and a polyalkylene ether triol general Equation III is simplified to:

$$Mw./C. = \frac{\text{total weight of all reactants}}{\text{total moles of triol}} \qquad (IV)$$

or $$Mw./C. = \frac{\text{gms. to triol} + \text{gms. of diol} + \text{gms. of tolylene diisocyanate}}{\text{total moles of triol}}$$
(V)

Generally to obtain the crosslinking specified above, about 10 to 25 percent total tolylene diisocyanate or an equivalent percentage of other diisocyanate by weight of the total components in the liquid reaction mixture, excluding filler, pigments and the like, are used. Ten to twenty-five percent total tolylene diisocyanate corresponds to about 0.58 mole to 1.44 moles of diisocyanate per 1000 grams of the polymeric polyurethane. The tolylene diisocyanate percentage fixes the total amount of glycol+triol to be about 90 to 75 percent, the maximum amount of glycol present in this mixture being about 10 percent of the total amount of glycol and triol present.

The inert filler in amounts ranging from about 35 to about 55 percent, by weight of the total liquid reaction mixtures, improves the chemical resistance of the cured polyurethane with no loss of other properties and hence lowers the cost of producing a polyurethane with optimum properties. Examples of suitable filler material include asbestos and powdered resinous materials. Ground silica is preferred, especially such silica which has been subsequently treated with a silane as gamma-aminopropyltriethoxysilane which is sold by Union Carbide Corporation under the name A-1100 silane. Another suitable silane is Dow Corning Z-6020 which is an amino functional silane having the ability to couple organic and inorganic material together, such silane containing primary and secondary amino groups. When a silane is used, it is essential that it be used in amounts ranging from about 0.25 to 1.0 weight percent based on the weight of the silica. A silane treated silica is especially advantageous in improving the tensile strength, reducing the compression set and increasing the chemical resistance of the cured polyurethane.

In addition to the above materials, minor amounts of low molecular weight triols such as 1,2,6, hexanetriol, glycerine, trimethylol propane; tetrols such as pentaerythritol; and/or polyisocyanates may be added for further crosslinking to the liquid mixture as well as other dissimilar glycols, pigments and the like. Such materials however are not essential for the polymeric polyurethane of the invention.

In preparing the formulations for the novel polyurethanes, it is essential to prevent gel formation and the like in the formulations, that a mixture of the diisocyanate and low molecular weight glycol be mixed with a mixture of the triol and catalyst. In other words, contrary to prior art teaching, where a diisocyanate is mixed with a low molecular weight triol (molecular weight below 500) in the prepolymer formulation with resultant gel formation, the diisocyanate in the present invention is mixed with a glycol to constitute a Part B prepolymer formulation; the triol is mixed with catalyst and filler to constitute a Part A prepolymer formulation. These formulations can be stored for an indefinite time and used when desired for forming the polyurethane. To exemplify:

Part A: The triol, ground filler and catalyst are charged to a stirred reactor equipped with a thermometer, vacuum take-off and a cooled vapor trap. A small amount of the glycol may also be included. The mixture is heated to about 123° C. whereupon the system is evacuated to a pressure of about 2–4 mm. with constant stirring while water and other vapors which volatilized are condensed in the cold trap. The triol mixture is then cooled and can be stored.

Part B: The diisocyanate is charged to a stirred reactor equipped with a nitrogen sparge, thermometer and cooling coil. Glycol is added slowly to the reactor, the resulting exotherm causing the temperature to rise to 75° C. The temperature is kept at 75° C. by controlling the rate of addition of dipropylene glycol, and cooling.

The polymeric polyurethane of the present invention can then be prepared by thoroughly mixing Part B with Part A in the desired proportions, quickly (within a maximum of ten minutes after mixing) pouring the mixture into a mold and curing the mixture at room temperature. To assure uniform cure conditions for test purposes, the filled mold can be placed in an oven at 110° F. for 24 hours, the test specimens then stripped from the mold and returned to the oven for an additional six days of cure and conditioning at 110° F.

As specified above, the novel polymeric solid polyurethanes of the present invention are particularly useful for pipe joints, the liquid reaction mixture being able to be used with any kind of a pipe requiring a gasketed joint. Examples of suitable pipe material with which the polyurethane liquid reaction mixture can be used to form solid polymeric polyurethane gaskets include cast iron, asbestos cement, polyvinyl chloride, concrete and ceramic clay.

The applicability of the novel polymeric polyurethane as pipe joints will be better understood by reference to the features hereinafter more fully described in connection with the annexed drawings setting forth certain illustrative embodiments of the invention and which are indicative of how the principles of the invention can be employed. It is to be understood that the invention, as to pipe joints, is not to be confined to these illustrative embodiments, for the invention is susceptible of embodiments in various forms, all coming within the scope of the appended claims.

Figure 1:
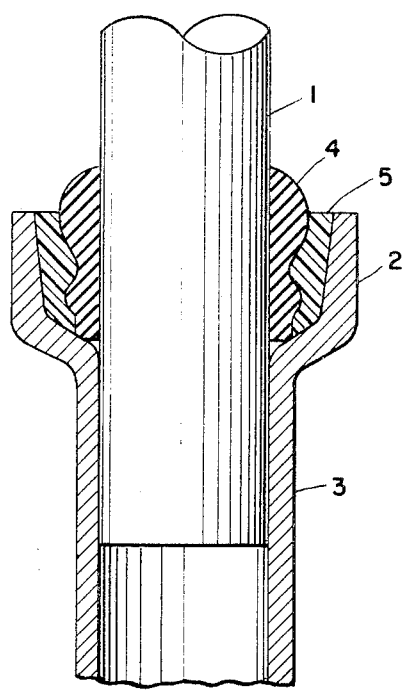
FIG. 1 shows, in cross-section, the formation of a sealing polyurethane gasket for a bell-type pipe end.
Figure 2:
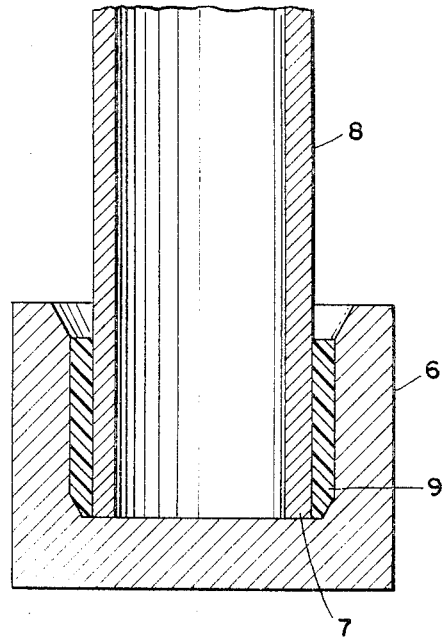
FIG. 2 shows, in cross-section, the formation of a sealing polyurethane gasket for the spigot end of pipe section of the same size as in FIG. 1.

Referring to FIGS. 1 and 2, a male mold 1 is inserted in the bell end 2 of a pipe sectoin 3. Part A and Part B formulations are thoroughly mixed and the mixture within a maximum of ten minutes poured into the bell end 2 of the pipe. In molding the bell end, a rubber mold ring 4 may be positioned within the bell end and around the internal pipe mold 1 to form the inner wall of the sealing ring cavity. After the polyurethane sealing ring 5 has been cast, the male mold 1 is withdrawn. The rubber mold ring 4 can then be collapsed and withdrawn.

The mold 6 for the spigot end 7 of the pipe section 8 is simply a mold chamber having the necessary internal configurations, which is positioned about the spigot end 7 of the pipe section 8 for casting the polyurethane sealing ring 9 as in FIG. 1 from a mixture of Part A and Part B formulations.

The liquid reaction mixtures for sealing rings 5 and 9 are generally poured at temperatures between 65° F. and 120° F. and demolded in 15 to 30 minutes which means that they gel in about 3 to 10 minutes. The in situ formed sealing rings can be put to use after they have gelled by frictionally interfitting the bell polyurethane sealing ring 5 with the spigot polyurethane sealing ring 9 to provide a polymeric polyurethane joint between the pipe sections 3 and 8. However, it is generally advantageous that the individual pipe sections be allowed to stand from one to seven days (the exact time depending upon cure temperature, catalyst, concentration and size of casting) to allow the sealing rings to attain their optimum properties. If desired, a post cure at 110° F. can be used.

Also, if desired, the inside surface of the bell end 2 and the outside surface of the spigot end 7 can be treated with a primer, prior to the pouring of the liquid polyurethane reaction mixture, to increase adherence of the in situ formed polyurethane sealing rings to the pipe walls. This operation merely involves coating said surfaces with a conventional primer and allowing the surfaces to dry before treatment with the polyurethane liquid reaction mixture, i.e., before pouring the liquid reaction mixture. Preferred primers are Union Carbide's A-1100 and Dow Corning's Z-6020.

The above operation can be modified in any desired manner; thus the pipe sections can be preheated before use in a preheated oven operating at 125° F. Also the Part A and Part B formulations can be maintained in storage at 75° F. prior to use.

The novel polyurethanes of the present invention are particularly useful in pipe joints. However, such polyurethanes can be used as a substitute for rubber, e.g., in gaskets, weatherstripping, water stops, potting or encapsulating compounds, flexible molds and vibration absorbing pads.

The following examples are given to aid in understanding the invention, the percentages unless otherwise specified being by weight. It is to be understood that the invention is not restricted to the specific compositions or conditions given in the examples. Said examples are rather only illustrative and should not be construed as limiting the invention which is properly delineated in the appended claims.

EXAMPLE 1(a)

Part A

| | Parts/100 | Molecular weight | Mole ×200 |
|---|---|---|---|
| Polypropylene ether triol CP 4000 [1] | 39.91 } 41.16 | {3,923} {2,720} | {2.03} {0.99} 3.0 |
| Polypropylene ether triol CP 260 [2] | 1.25 | 252 | |
| Dipropylene glycol | 2.03 | 134 | 3.0 |
| Silica filler | 44.91 | | |
| Lead octoate (24% Pb) [3] | 0.20 | | |

Part B

| | Parts/100 | Molecular weight | Mole ×200 |
|---|---|---|---|
| Dipropylene glycol | 2.03 | 134 | 3.0 |
| Tolylene diisocyanate | 9.67 | 174 | 11 |

[1] Dow Voranol CP 4000.
[2] Dow Voranol CP 260.
[3] The designation (24% Pb) means a commercial solution containing 24 percent lead by weight.

Part B was thoroughly mixed with Part A and the mixture quickly poured into a mold of vertically aligned steel plates to give a specimen 5½ inches long by 1½ inches wide by ⅛ inch thick. At room temperature the mixture cured hard to the touch in 15 minutes. To insure uniform cure conditions, the filled mold was placed in an oven at 110° F. for 24 hours. The specimens were stripped from the mold and then returned to the oven for an additional six days of cure and conditioning at 110° F.

(b) For comparative purposes, the following polyurethane was prepared:

Part A

| | Parts/100 | Molecular weight | Moles ×200 |
|---|---|---|---|
| Polypropylene ether triol CP 260 [1] | 0.93 | 252 | 0.73 |
| Polypropylene ether glycol PPG 1025 [2] | 30.52 } 43.31 | {1,018} {1,186} | {6.0} {1.3} 7.3 |
| Polypropylene ether glycol PPG 2025 [3] | 12.79 | 1,958 | |
| Silica filler | 44.88 | | |
| Lead octoate (24% Pb) | 0.27 | | |

Part B

| | Parts/100 | Molecular weight | Moles ×200 |
|---|---|---|---|
| 1,1,1-trimethylolpropane | 0.97 | 134 | 1.4 |
| Tolylene diisocyanate | 9.65 | 174 | 11. |

[1] Dow Voranol CP 260.
[2] Union Carbide PPG 1025.
[3] Union Carbide PPG 2025.

As in 1(a), Part B was thoroughly mixed with Part A, quickly poured into a mold and cured.

(c) For further comparative purposes, the following polyurethane was prepared:

Part A

| | Parts/100 | Molecular weight | Moles ×200 |
|---|---|---|---|
| Polypropylene ether glycol PPG 1025 [1] | 19.70 } 41.40 | {1,018} {1,360} | {3.9} {2.2} 6.1 |
| Polypropylene ether glycol PPG 2025 [2] | 21.70 | 1,958 | |
| Silica filler | 49.69 | | |
| Dibutyl tin dilaurate | 0.91 | | |

Part B

| | Parts/100 | Molecular weight | Moles ×200 |
|---|---|---|---|
| 1,1,1-trimethylolpropane | 0.73 | 134 | 1.1 |
| Tolylene diisocyanate | 7.27 | 174 | 8.4 |

[1] Union Carbide PPG 1025.
[2] Union Carbide PPG 2025.

As in 1(a), Part B was mixed with Part A, quickly poured into a mold and cured.

Both compositions (a) and (b), supra, had a NCO/OH ratio of 1.05/1, while composition (c) had a NCO/OH ratio of 1.08/1. Composition (a) had a molecular weight per crosslink of 3600; composition (b) had a molecular weight per crosslink of 5100; and composition (c) had a molecular weight per crosslink of 8890. The molecular weight per crosslink of compositions (a), (b) and (c) was calculated as follows:

Composition (a)

|  | Molecular weight | Moles | Grams |
|---|---|---|---|
| Mixture of: |  |  |  |
| Polypropylene ether triols [1] | 2,720 | 3.0 | 8,160 |
| Dipropylene glycol | 134 | 6.0 | 804 |
| Tolylene diisocyanate [2] | 174 | 11 | 1,914 |

[1] Mixture of Voranol CP 4,000 and CP 260.
[2] Excess TDI was not included in calculations; excess TDI is 0.50 mole = 0.50×174 = 87 gms.

$$\text{Mw./C} = \frac{\text{weight triol} + \text{weight diol} + \text{weight TDI}^1}{\text{Moles Triol}}$$

$$= \frac{8{,}160 + 804 + (1{,}914 - 87)}{3.0} = 3600$$

Composition (b)

|  | Molecular weight | Moles | Grams |
|---|---|---|---|
| Mixture of: |  |  |  |
| Polypropylene ether triol | 252 | 0.73 | 184 |
| Polypropylene ether glycols [1] | 1,186 | 7.3 | 8,658 |
| Tolylene diisocyanate [2] | 174 | 11 | 1,914 |
| 1,1,1-trimethylol propane | 134 | 1.4 | 192 |

[1] Mixture of PPG 1,025 and PPG 2,025.
[2] Excess TDI not included in calculations; excess TDI = 0.46 mole is 0.46×174 = 80 gms.

Composition (c)

|  | Molecular weight | Moles | Grams |
|---|---|---|---|
| Mixture of: |  |  |  |
| Polypropylene ether glycols [1] | 1,360 | 6.1 | 8,296 |
| 1,1,1-Trimethylol propane | 134 | 1.1 | 147 |
| Tolylene diisocyanate [2] | 174 | 8.4 | 1,462 |

[1] Mixture of PPG 1025 and PPG 2025.
[2] Excess diisocyanate not included in calculations; excess TDI 0.7 mole = 0.7×174 = 122 gms.

$$\text{Mw./C.} = \frac{\text{weight triol} + \text{weight diol} + \text{weight TDI}^3}{\text{mole troil}}$$

$$= \frac{8296 + 147 + (1462 - 122)}{1.1} = 8890$$

A comparison of the physical properties of compositions (a), (b) and (c) showed the following:

|  | (a) | (b) | (c) |
|---|---|---|---|
| Tensile strength, p.s.i.[1] | 756 | 522 | 43 |
| Elongation, percent [2] | 118 | 80 | 117 |
| Hardness, Shore A [3] | 73 | 74 | 70 |

[1] As determined here and in the other examples by ASTM D 412–51 T (Die C) at 77±5° F.
[2] As determined here and in the other examples by ASTM D 412–51 T (Die C) at 77±5° F.
[3] As determined here and in the other examples by ASTM D 676–58 T at 77±5° F., 5 second reading.

The remarkable tensile strength of composition 1(a) according to the present invention in comparison with the tensile strength of prior art compositions 1(b) and 1(c) is readily evident from the foregoing table.

EXAMPLE 2

Part A

|  | Parts/100 | Molecular weight | Moles ×200 |
|---|---|---|---|
| Polypropylene ether triol CP 4000 [1] | 4.71 } 41.08 | 3,988 } 2,717 | 0.24 } 2.8 |  
| Polypropylene ether triol TP 2540 [2] | 36.37 | 2,609 |  |
| Dipropylene glycol | 2.03 | 134 | 3.0 |
| Silica filler | 44.80 |  |  |
| Lead octoate (24% Pb) | 0.40 |  |  |

Part B

|  |  |  |  |
|---|---|---|---|
| Dipropylene glycol | 2.03 | 134 | 3.0 |
| Tolylene diisocyanate | 9.66 | 174 | 11 |

[1] Dow Voranol CP 4000.
[2] Wyandotte Pluracol TP 2540.

As in Example 1(a), Part A and Part B were thoroughly mixed, molded and cured. The cured composition had a molecular weight per crosslink of 3600, an NCO/OH ratio of 1.05/1, a tensile strength (p.s.i.) of 628, a percent elongation of 116, and a Shore A hardness of 74. The remarkable tensile strength was unexpected in view of prior art formulations.

EXAMPLE 3

Part A

|  | Parts/100 | Molecular weight | Moles ×200 |
|---|---|---|---|
| Polypropylene ether triol CP 4000 [1] | 39.56 } 40.89 | 3,988 } 2,705 | 2.0 } 3.0 |
| Polypropylene ether triol CP 260 [2] | 1.33 | 256 | 1.0 |
| Dipropylene glycol | 2.03 | 134 | 3.0 |
| Silica filler | 44.81 |  |  |
| Lead octoate (24% Pb) | 0.40 |  |  |

Part B

|  |  |  |  |
|---|---|---|---|
| 2,2,4-trimethylpentane 1,3-diol | 2.21 | 146 | 3.0 |
| Tolylene diisocyanate | 9.66 | 174 | 11 |

[1] Dow Voranol CP 4000 MW = 3,988.
[2] Dow Voranol CP 260 MW = 256.

As in Example 1(a), Part A and Part B were thoroughly mixed, molded and cured. The cured composition had a molecular weight per crosslink of 3620, an NCO/OH ratio of 1.05/1, a tensile strength (p.s.i.) of 710, a percent elongation of 130, and a Shore A hardness of 75.

EXAMPLE 4

Part A

|  | Parts/100 | Molecular weight | Moles ×200 |
|---|---|---|---|
| Polypropylene ether triol CP 4000 [1] | 4.68 } 40.80 | 3,988 } 2,720 | 0.23 } 3.0 |
| Polypropylene ether triol TP 2540 [2] | 36.12 | 2,609 | 2.8 |
| Dipropylene glycol | 1.76 | 134 | 2.6 |
| Silica filler | 44.90 |  |  |
| Silane A-1100 [3] | 0.23 |  |  |
| Pigment base: |  |  |  |
| dipropylene glycol | 0.25 |  | [4] 0.37 |
| titanium dioxide | 0.25 } 0.50 |  |  |
| chromium oxide |  |  |  |
| iron oxide |  |  |  |
| Lead octoate (24% Pb) | 0.20 |  |  |

Part B

|  |  |  |  |
|---|---|---|---|
| Dipropylene glycol | 2.01 | 134 | 3.0 |
| Tolylene diisocyanate | 9.60 | 174 | 11 |

[1] Dow Voranol CP 4000 MW = 3,988.
[2] Wyandotte Pluracol TP 2540 MW = 2,609.
[3] Union Carbide.
[4] DPG in pigment.

As in Example 1(a), Part A and Part B were thoroughly mixed, molded and cured. The cured composition had a molecular weight per crosslink of 3600, an NCO/OH ratio of 1.05/1, a tensile strength (p.s.i.) of 1032, a percent elongation of 114, and a Shore A hardness of 74.

EXAMPLE 5

Part A

|  | Parts/100 | Molecular weight | Moles ×200 |
|---|---|---|---|
| Polypropylene ether triol CP 4000 [1] | 39.47 } 40.73 | 3,988 } 2,748 | 2.0 } 3.0 |
| Polypropylene ether triol CP 260 [2] | 1.26 | 256 | 1.0 |
| Dipropylene glycol | 1.76 | 134 | 2.6 |
| Silica filler | 45.02 |  |  |
| Silane A-1100 | 0.23 |  |  |
| Pigment base: |  |  |  |
| dipropylene glycol | 0.25 |  | [3] 0.37 |
| titanium dioxide | 0.25 } 0.50 |  |  |
| chromium oxide |  |  |  |
| iron oxide |  |  |  |
| Lead octoate | 0.25 |  |  |

Part B

|  | | | |
|---|---|---|---|
| Dipropylene glycol | 2.05 | 134 | 3.0 |
| Tolylene diisocyanate | 9.46 | 174 | 11 |

[1] Dow Voranol CP 4000.
[2] Dow Voranol CP 260.
[3] DPG in pigment.

As in Example 1(a), Part A and Part B were thoroughly mixed, molded and cured. The cured composition had a molecular weight per crosslink of 3590, an NCO/OH ratio of 1.05/1, a tensile strength (p.s.i.) of 1183, a percent elongation of 158, and a Shore A hardness of 72.

The following table shows the effect of reagents on tensile strength, compression set and weight change after 14 days' immersion at 140° F. (the percent compression set in the table was determined according to ASTM D395–55 Method B, a test period of 24 hours being used at 77±5° F. with a 30 second recovery after removal from the test apparatus):

ACCELERATED CHEMICAL RESISTANCE TESTS
[The effect of reagents on tensile strength, compression set and weight change after 14 days immersion at 140° F.]

| Example | Property | Initial | H₂O | 20% H₂SO₄ | 5% NaOH | 1% NaOCl | Wet air |
|---|---|---|---|---|---|---|---|
| 1(a) | Tensile strength (p.s.i.) | 756 | 500 | 511 | 440 | 387 | 540 |
|  | Compression set (percent) |  | 1.9 | 2.4 | 2.6 | 3.3 | 1.1 |
|  | Weight change (percent) |  | −0.22 | +0.15 | −1.47 | −7.77 | −0.15 |
| 1(b) | Tensile strength (p.s.i.) | 522 | 371 | 403 | 352 | 320 | 416 |
|  | Compression set (percent) |  | 4.4 | 4.0 | 4.6 | 4.5 | 1.6 |
|  | Weight change (percent) |  | −0.16 | +0.22 | −0.97 | −8.02 | −0.10 |
| 1(c) | Tensile strength (p.s.i.) | 437 | 291 | 237 | 112 | 219 | 335 |
|  | Compression set (percent) |  | 5.0 | 5.0 | 13.1 | 7.4 | 4.9 |
|  | Weight change (percent) |  | −0.09 | +0.50 | −11.39 | −10.52 | −0.05 |
| 2 | Tensile strength (p.s.i.) | 628 | 460 | 468 | 446 | 355 | 493 |
|  | Compression set (percent) |  | 2.7 | 3.4 | 3.0 | 3.9 | 1.7 |
|  | Weight change (percent) |  | −0.05 | +0.23 | −0.27 | −7.39 | −0.03 |
| 3 | Tensile strength (p.s.i.) | 710 | 556 | 526 | 514 | 369 | 574 |
|  | Compression set (percent) |  | 2.7 | 4.0 | 2.3 | 3.1 | 1.5 |
|  | Weight change (percent) |  | −0.36 | −0.01 | −0.76 | −13.34 | −0.29 |
| 4 | Tensile strength (p.s.i.) | 1,032 | 889 | 818 | 708 | 704 | 940 |
|  | Compression set (percent) |  | 0.3 | 0.9 | 1.1 | 1.9 | 0.8 |
|  | Weight change (percent) |  | +0.03 | +0.17 | −0.90 | −4.61 | −0.06 |
| 5 | Tensile strength (p.s.i.) | 1,183 | 1,189 |  | 1,170 | 970 |  |
|  | Compression set (percent) |  |  |  |  |  |  |
|  | Weight change (percent) |  | −0.24 |  | −0.97 | −4.74 |  |

For the chemical resistance tests, all the test specimens were allowed to remain in a convection oven for 7 days at 110±5° F. Then (1 x 2¾ x ⅛ in.) sections of the test specimens were immersed in chemical test solutions in glass jars, and the jars placed in a water bath at 140±5° F. for 14 days. The sections were then removed from the bath, washed with water and placed in a conditioning oven at 110°±5° F. for 7 days, and further conditioned at 75° F., 50% R.H., for at least 3 hours prior to testing. The sections were then weighed and the weight gain or loss calculated.

In addition to the superior tensile strength of the polyurethanes of the present invention (Examples 1(a), 2, 3, 4 and 5), the above table illustrates the superior chemical resistance and compression set properties of the compositions of the present invention, in comparison with prior art polyurethanes exemplified by Examples 1(b) and 1(c).

The above table shows the compression set in wet air which is substantially the same as the initial compression set. The initial compression set (absence any immersion) of Example 5 composition is 0.6%. The initial compression set of Examples 1(a), 1(b), 1(c), 2, 3, and 4 are respectively 1.0% 1.4%, 1.8%, 0.8%, 0.2 and 0.5%.

EXAMPLE 6

PART A

|  | Parts/100 | Molecular weight | Moles ×200 |
|---|---|---|---|
| Polypropylene ether triol CP 4000 [1] | 42.5 }43.44 | {3,951 }2,447 { 2.2} 3.6 |  |
| 1,1,1-trimethylolpropane | 0.94 | 134 1.4 |  |
| "O" silica | 44.49 |  |  |
| Silane A-1100 | 0.24 |  |  |
| Pigment base: |  |  |  |
| CP 4000 | 0.27 |  | [2] 0.014 |
| titanium dioxide chromium oxide iron oxide | 0.27 } 0.54 |  |  |
| Lead octate | 0.29 |  |  |

Part B

|  | | | |
|---|---|---|---|
| Polypropylene ether triol CP 4000 [1] | 5.5 | 3,951 | 0.28 |
| Tolylene diisocyanate | 5.5 | 174 | 6.3 |

[1] Dow Voranol CP 4000 MW=3,951.
[2] CP 4,000 in pigment.

Part A and Part B were thoroughly mixed and cured as in Example 1(a). The cured composition had a molecular weight per crosslink of 2830, an NCO/OH ratio of 1.1/1, a tensile strength (p.s.i.) of 825, a percent elongation of 120, and a Shore A hardness of 65.

EXAMPLE 7

Part A

|  | Parts/100 | Molecular weight | Moles ×200 |
|---|---|---|---|
| Polypropylene ether triol CP 4000 [1] | 40.00 }41.30 | {3,988 }2,735 {2.0 }3.0 |  |
| Polypropylene ether triol CP 260 [2] | 1.30 | 256 1.0 |  |
| Dipropylene glycol | 2.03 |  | 134 3.0 |
| Silica filler | 44.81 |  |  |
| Lead octoate (24% Pb) | 0.40 |  |  |

Part B

|  | | | |
|---|---|---|---|
| 2-methyl-2,4-pentanediol (hexylene glycol) | 1.79 | 118.2 | 3.0 |
| Tolylene diisocyanate | 9.67 | 174 | 11 |

[1] Dow Voranol CP 4000 MW 3,988.
[2] Dow Voranol CP 260 MW-256.

Part A and Part B were thoroughly mixed and cured as in Example 1(a). The cured composition had a molecular weight per crosslink of 3620, an NCO/OH ratio of 1.05/1, a tensile strength (p.s.i.) of 621, a percent elongation of 114, and a Shore A hardness of 74.

EXAMPLE 8

PART A

|  | Parts/100 | Molecular weight | moles ×200 |
|---|---|---|---|
| Polypropylene ether triol CP 4000 | 39.40 }39.99 | {3923 }2769 {2.0 }2.9 |  |
|  | 0.59 | 134 0.9 |  |
| 1,1,1-Trimethylolpropane | 2.02 | 134 | 3.0 |
| Dipropylene glycol |  |  |  |
| Silane A-1100 | 0.23 |  |  |
| Pigment Base: |  |  |  |
| CP 4000 | 0.25 |  | [2] 0.012 |
| titanium dioxide chromium oxide iron oxide | 0.25 } 0.50 |  |  |
| Silica | 44.97 |  |  |
| Lead octoate (24% lead) | 0.20 |  |  |

PART B

| | | | |
|---|---|---|---|
| Dipropylene glycol | 2.02 | 134 | 3.0 |
| Toluene diisocyanate [1] | 10.08 | 174 | 12 |

[1] Alternatively referred to in the specification as tolylene diisocyanate.
[2] CP 4,000 in pigment.

Part A and Part B were thoroughly mixed and cured as in Example 1(a). The cured composition had a molecular weight per crosslink of 3650, an NCO/OH ratio of 1.12/1, a tensile strength (p.s.i.) of 1093, a percent elongation of 131, and a Shore A hardness of 74.

What is claimed is:

1. A combination of pipe sections and joint forming annular rubbery polyurethane rings for connecting said pipe sections, each ring comprising a cured solid polyurethane having a tensile strength in excess of 600 p.s.i. and being the reaction product of a liquid reaction mixture consisting essentially of an organic diisocyanate, a polyalkylene ether triol of an average molecular weight between about 750 and 4750, a curing catalyst, a polyalkylene diol of molecular weight between about 110 and 400, and a solid inert filler, said alkylene radical of the polyalkylene triol in said liquid reaction mixture containing at least two carbon atoms, said triol containing primary hydroxyl groups and being liquid at room temperature said organic diisocyanate being present in an amount equivalent to about 10 to 25 percent tolylene diisocyanate by weight of said triol and diol, the maximum amount of diol present in the mixture being about 10 percent of the total amount of diol and triol present, the liquid reaction mixture having an isocyanate to hydroxyl ration of about 0.9 to about 1.1 NCO for each OH group in the liquid reaction mixture, said cured polyurethane having about one crosslink for each 1000 to 4000 molecular weight of the cured polyurethane, said liquid reaction mixture containing the solid inert filler in an amount ranging from about 35 to about 55 percent by weight of the liquid reaction mixture.

2. A composition according to claim 1 wherein the triol is a polypropylene ether triol, the diol is dipropylene glycol, the diisocyanate is tolylene diisocyanate and the filler is silica.

3. A composition according to claim 1 wherein the triol is a mixture of polypropylene ether triol and 1,1,1-trimethylolpropane, the diol is dipropylene glycol, the diisocyanate is tolylene diisocyanate and the filler is a silane treated silica.

4. A composition according to claim 1 wherein the triol is a polypropylene ether triol, the diol is dipropylene glycol, the diisocyanate is tolylene diisocyanate and the filler is a silane treated silica.

5. A composition according to claim 1 wherein the triol is a polypropylene ether triol, the diol is a mitxure of dipropylene glycol and 2-methyl-2,4-pentanediol, the diisocyanate is tolylene diisocyanate and the filler is a silica.

6. A composition according to claim 1 wherein the triol is polypropylene ether triol, the diol is a mixture of dipropylene glycol and 2,2,4-trimethylpentane-1,3-diol, the diisocyanate is tolylene diisocyanate and the filler is a silica.

7. A combination of pipe sections and joint forming annular rubbery polyurethane rings for connecting said pipe sections, each ring comprising a cured solid polyurethane having a tensile strength in excess of 600 p.s.i. and being the reaction product of a liquid reaction mixture consisting essentialy of an organic diisocyanate, a polyalkylene ether triol of an average molecular weight between about 750 and 4750, a curing catalyst, a polyalkylene diol of molecular weight between about 110 and 400, and a solid inert filler, said alkylene radical of the polyalkylene triol in said liquid reaction mixture containing at least two carbon toms, said triol containing secondary hydroxyl groups and being liquid at room temperature said organic diisocyanate being present in an amount equivalent to about 10 to 25 percent tolylene diisocyanate by weight of said triol and diol, the maxium amount of diol present in the mixture being about 10 percent of the total amount of diol and triol present, the liquid reaction mixture having an isocyanate to hydroxyl ratio of about 0.9 to about 1.1 NCO for each OH group in the liquid reaction mixture, said cured polyurethane having about one crosslink for each 1000 to 4000 molecular weight of the cured polyurethane, said liquid reaction mixture containing the solid inert filler in an amount ranging from about 35 to about 55 percent by weight of the liquid reaction mixture.

References Cited

UNITED STATES PATENTS 3,201,136   8/1965   Harrison et al. ____ 277—207 XR
3,250,538   5/1966   Albon _____ 277—207—XR LAVERNE D. GEIGER, Primary Examiner J. S. MEDNICK, Assistant Examiner U.S. Cl. X.R.

277—207; 260—77.5; 285—291

PO-1050
(5/69)

UNITED STATES PATENT OFFICE
CERTIFICATE OF CORRECTION

Patent No. 3,519,283      Dated November 13, 1970

Inventor(s) Irving Tashlick et al.

It is certified that error appears in the above-identified patent and that said Letters Patent are hereby corrected as shown below:

Col. 1, line 36, "ployurethane" should be -- polyurethane --.

Col. 2, lines 5-6, "substiture" should be -- substitute --

Col. 3, line 4, "n1OH" should be -- $n_1OH$ --;

line 5, "n2OH" should be -- $n_2OH$ --;
line 74, "mixtures" should be -- mixture --.

Col. 6, line 7, delete each occurrence of "{";

line 37, delete each occurrence of "{";

line 57, delete each occurrence of "{".

Col. 7, lines 12-18, rewrite as follows:

$$-- Mw/C = \frac{\text{Weight Triol + Weight Diol + Weight TDI}^2}{\text{Moles Triol}} =$$

$$\frac{8160 + 804 + (1914 - 87)}{3.0} = 3600$$

[1] Mixture of Voranol CP 4000 and CP 260

[2] Excess TDI was not included in calculations; excess TDI is 0.50 mole = 0.50 x 174 = 87 gms. --;

PO-1050
(5/69)

UNITED STATES PATENT OFFICE
CERTIFICATE OF CORRECTION

Patent No. 3,519,283      Dated November 13, 1970

Inventor(s) Irving Tashlick et al.

It is certified that error appears in the above-identified patent and that said Letters Patent are hereby corrected as shown below:

Col. 7, after line 27, insert the following:

$$-- M_w/C = \frac{\text{Weight Triol} + \text{Weight Diol} + \text{Weight TDI}^2}{\text{Moles Triol}} =$$

$$\frac{192 + 8658 + 184 + (1914 - 80)}{2.13} = 5100 \; --;$$

Col. 7, lines 38-44, rewrite as follows:

$$-- M_w/C = \frac{\text{Weight Triol} + \text{Weight Diol} + \text{Weight TDI}^2}{\text{Moles Triol}} =$$

$$\frac{8296 + 147 + (1462 - 122)}{1.1} = 8890 \; --;$$

[1] Mixture of PPG 1025 and PPG 2025

[2] Excess diisocyanate not included in calculations; excess TDI 0.7 moles = 0.7 x 174 = 122 gms.--;

Col. 7, line 52, "43" should be -- 437 --;
line 53, "117" should be -- 110 --;
line 54, "70" should be -- 72 --;

Col. 7, line 73, delete each occurrence of " { ".

Col. 8, line 20, delete each occurrence of " { ";

Col. 8, line 42, delete each occurrence of " { ";

Col. 8, line 68, delete each occurrence of " { ";

PO-1050
(5/69)

UNITED STATES PATENT OFFICE
CERTIFICATE OF CORRECTION

Patent No. 3,519,283              Dated November 13, 1970

Inventor(s) Irving Tashlick et al.

It is certified that error appears in the above-identified patent and that said Letters Patent are hereby corrected as shown below:

Col. 9, line 69, delete each occurrence of "$\{$";

Col. 9, line 75, "octate" should be -- Octoate --.

Col. 10, line 45, delete each occurrence of "$\{$";

Col. 10, line 67, delete each occurrence of "$\{$".

Col. 11, line 31, "ration" should be -- ratio --.
Col. 12, line 16, "essentialy" should be -- essentially --;
Col. 12, line 22, "toms" should be -- atoms --;

SIGNED AND
SEALED
MAR 9 1971

(SEAL)
Attest:

Edward M. Fletcher, Jr.
Attesting Officer

WILLIAM E. SCHUYLER, JR.
Commissioner of Patents